United States Patent
Thompson et al.

(10) Patent No.: US 11,015,142 B1
(45) Date of Patent: May 25, 2021

(54) EXTRACTION SYSTEM AND METHODS FOR PREPARING A BOTANICAL OIL

(71) Applicant: Unified Science, LLC, Center City, MN (US)

(72) Inventors: Jon Thompson, Center City, MN (US); Conor Smith, Blaine, MN (US); Yuri Gerner, Mendota Heights, MN (US)

(73) Assignee: Unified Science, LLC, Center City, MN (US)

( * ) Notice: Subject to any disclaimer, the term of this patent is extended or adjusted under 35 U.S.C. 154(b) by 357 days.

(21) Appl. No.: 15/787,994

(22) Filed: Oct. 19, 2017

Related U.S. Application Data (60) Provisional application No. 62/410,628, filed on Oct. 20, 2016.

(51) Int. Cl.
  *C11B 9/02*   (2006.01)
  *B01D 11/04*  (2006.01)
  *B01D 11/02*  (2006.01)

(52) U.S. Cl.
  CPC .......... *C11B 9/025* (2013.01); *B01D 11/0203* (2013.01); *B01D 11/0215* (2013.01); *B01D 11/0292* (2013.01); *B01D 11/0407* (2013.01)

(58) Field of Classification Search
  CPC . B01D 11/02; B01D 11/0203; B01D 11/0215; B01D 11/028; B01D 11/0288; B01D 11/0253; B01D 11/0219; B01D 11/0292; B01D 11/0296; B01D 11/0403; B01D 11/0407; C11B 9/025
  See application file for complete search history.

(56) References Cited

U.S. PATENT DOCUMENTS

| | | | | |
|---|---|---|---|---|
| 1,463,154 A | * | 7/1923 | Cummins | B01D 11/0296 202/169 |
| 1,478,180 A | * | 12/1923 | Given | C01B 17/033 423/567.1 |
| 1,679,728 A | * | 8/1928 | Lynn | C11B 1/10 202/169 |
| 1,865,615 A | * | 7/1932 | Coleman | C11B 1/10 554/10 |
| 1,925,877 A | * | 9/1933 | Mitchum | A23C 3/031 165/61 |
| 2,009,232 A | * | 7/1935 | Hood | D01D 10/0409 118/52 |

(Continued)

FOREIGN PATENT DOCUMENTS

GB    1057911    * 2/1967

OTHER PUBLICATIONS

OSHA Standard 1926.962, Grounding for the protection of employees (2014), 4 pages. (Year: 2014).*

(Continued)

*Primary Examiner* — Katherine Zalasky McDonald
(74) *Attorney, Agent, or Firm* — Haugen Law Firm PLLP (57) ABSTRACT

An extraction system for obtaining oils and other constituents from raw botanical materials includes an array of separation chambers for fractionalized recovery of dissolved constituents in a supercritical solvent fluid. Collection of the dissolved constituents is facilitated with a pressure-stable collection vessel that is adaptable to sequentially collect precipitate from the array of separation chambers.

21 Claims, 7 Drawing Sheets

(56) References Cited

U.S. PATENT DOCUMENTS

| | | | | |
|---|---|---|---|---|
| 2,152,665 | A * | 4/1939 | Rosenthal | B01D 11/0242 554/16 |
| 2,198,412 | A * | 4/1940 | Mcdonald | C11B 1/108 210/771 |
| 2,200,983 | A * | 5/1940 | Dinley | B01D 11/0226 554/12 |
| 2,414,418 | A * | 1/1947 | Lofton, Jr. | C07C 45/80 568/324 |
| 3,432,089 | A * | 3/1969 | Schibbye | F02B 53/00 418/88 |
| 4,708,599 | A * | 11/1987 | Suzuki | F04C 28/24 417/295 |
| 5,026,549 | A * | 6/1991 | Coutiere | B01D 11/02 424/725 |
| 5,186,817 | A * | 2/1993 | Paspek | B09C 1/02 208/188 |
| 5,271,903 | A * | 12/1993 | Durst | B01D 11/0203 210/511 |
| 5,281,732 | A * | 1/1994 | Franke | A23C 19/06 554/16 |
| 5,388,967 | A * | 2/1995 | Firnhaber | F04B 49/03 251/63.4 |
| 5,516,923 | A * | 5/1996 | Hebert | B01D 35/153 554/12 |
| 5,525,746 | A * | 6/1996 | Franke | A24B 15/26 426/417 |
| 5,700,464 | A * | 12/1997 | Silver | B01D 29/6476 424/123 |
| 6,111,119 | A * | 8/2000 | Trout | B01D 11/0219 554/16 |
| 7,384,557 | B2 * | 6/2008 | Phillips | C10G 1/04 196/14.52 |
| 7,700,368 | B2 * | 4/2010 | Flockhart | A61P 25/06 436/177 |
| 8,262,760 | B2 * | 9/2012 | Fogelman | B01D 11/0203 55/319 |
| 8,366,405 | B2 * | 2/2013 | Miyamura | F04C 28/12 417/212 |
| 8,580,116 | B2 * | 11/2013 | Catchpole | B01D 11/0203 210/634 |
| 8,801,941 | B2 * | 8/2014 | Beltz | B01D 11/0203 210/634 |
| 9,132,363 | B2 | 9/2015 | Joseph | |
| 9,327,210 | B1 * | 5/2016 | Jones | B01D 11/0219 |
| 9,574,799 | B2 * | 2/2017 | Buese | B01D 11/0284 |
| 2001/0036586 | A1 | 11/2001 | Adachi et al. | |
| 2002/0045347 | A1 | 4/2002 | Worm et al. | |
| 2002/0144717 | A1 * | 10/2002 | Tunnicliffe | C10G 21/00 134/26 |
| 2003/0017216 | A1 * | 1/2003 | Schmidt | A61K 36/185 424/725 |
| 2004/0147767 | A1 | 7/2004 | Whittle et al. | |
| 2004/0147769 | A1 * | 7/2004 | Davis | B01D 11/028 554/9 |
| 2008/0128261 | A1 * | 6/2008 | Balass | B01D 5/006 202/176 |
| 2011/0100894 | A1 * | 5/2011 | Miller | B01D 11/0219 210/236 |
| 2011/0133120 | A1 * | 6/2011 | McGhee | C11B 9/025 252/182.12 |
| 2013/0251824 | A1 * | 9/2013 | Hospodor | B01D 11/0292 424/725 |
| 2014/0163247 | A1 * | 6/2014 | Buese | B01D 11/0284 554/8 |
| 2014/0190890 | A1 * | 7/2014 | Sidhu | B01D 15/10 210/656 |
| 2014/0369893 | A1 * | 12/2014 | Ellis | C11B 1/10 422/119 |
| 2015/0105455 | A1 | 4/2015 | Bjorncrantz | |
| 2015/0105569 | A1 * | 4/2015 | Emo | C11B 9/025 554/20 |
| 2015/0119592 | A1 * | 4/2015 | Hamler | C11B 1/10 554/16 |
| 2015/0125360 | A1 * | 5/2015 | Wasserman | B01D 11/0215 422/280 |
| 2015/0126757 | A1 * | 5/2015 | Wasserman | C11B 1/10 554/9 |
| 2015/0224422 | A1 * | 8/2015 | Dabao | B01D 11/0296 422/280 |
| 2015/0375136 | A1 * | 12/2015 | Swan | C11B 9/027 202/170 |
| 2016/0228789 | A1 | 8/2016 | Joseph | |
| 2016/0243177 | A1 | 8/2016 | Franklin | |
| 2017/0240840 | A1 * | 8/2017 | Privitera | C11B 9/02 |

OTHER PUBLICATIONS

King et al. Supercritical fluid-adsorbate-adsorbent systems. Charpentier and Sevenants; Supercritical Fluid Extraction and Chromatography ACS Symposium Series; American Chemical Society: Washington, DC, 1988, p. 63-88. (Year: 1988).*

Subramanian, "Flow through packed and fluidized beds," 6 pages. (Year: 2014).*

G.N. Sapkale, et al. "Supercritical Fluid Extraction" Int. J. Chem. Si.:8(2), 2010, 729-743.

Waters Corp., "Supercritical Fluid Extraction (SFE) Systems", accessed at "http://www.waters.com/waters/en_US/Supercritical-Fluid-Extraction-%28SFE%29-Systems/nav.htm?cid=10146521&locale=en_US", copyright 2016.

Capuzzo et al., "Supercritical Fluid Extraction of Plant Flavors and Fragrances", Molecules Jun. 19, 2013. 18, 7194-7238.

Eden Labs, "Supercritical CO2 Extraction", http:www.edenlabs.com/processes/co2-extraction, last accessed Aug. 30, 2016.

* cited by examiner

EXTRACTION SYSTEM AND METHODS FOR PREPARING A BOTANICAL OIL

CROSS-REFERENCE TO RELATED APPLICATIONS

This application claims priority to U.S. Provisional Patent Application Ser. No. 62/410,628, filed on Oct. 20, 2016 and entitled "Extraction Systems and Methods for Preparing a Botanical Oil," the content of which being incorporated herein in its entirety.

FIELD OF THE INVENTION

The present invention relates to extraction systems generally, and more particularly to extraction systems and methods for obtaining oils from raw botanical materials.

BACKGROUND OF THE INVENTION

Extraction can be defined as the removal of soluble material from an insoluble residue, either liquid or solid, by treatment with a solvent. Extraction is therefore a solution process that depends upon both solubility and mass transfer phenomena. Extraction techniques are often employed to separate active portions of plant tissue from the inactive or inert components using appropriate solvents. While traditional solvent extraction, such as liquid-liquid extraction and partitioning, is a well-known approach to separate compounds based upon their relative solubility in two different immiscible liquids, its performance and desirability are limited due to slow raw material penetration rates by the solvent, and because traditional solvents of the required purity tend to be expensive, and can also cause problems with proper disposal after use.

More recently, supercritical fluids have been investigated for use as solvents in extraction systems. Supercritical solvents such as carbon dioxide, propane, butane, or ethylene have been identified for extractions performed on biological materials at relatively low temperatures, thereby limiting thermal degradation of the sample, and avoiding the use of toxic solvents. Supercritical carbon dioxide, for example, has a near-ambient critical temperature ($T_c$=31° C.). Extraction conditions for supercritical carbon dioxide therefore need only be slightly above the critical temperature of 31° C. and critical pressure ($P_c$) of 74 bar (1,083 psi). Moreover, carbon dioxide is non-toxic, non-flammable, odorless, tasteless, inert, and inexpensive.

Supercritical fluid extraction (SFE) processes are well known, and include a pump for the solvent, a pressure cell to contain the sample, a mechanism for maintaining elevated pressure in the system, and a separation vessel. In the most basic arrangement, liquid solvent is pumped to a heating zone, where it is heated and pressurized to supercritical conditions and passed into an extraction vessel where it rapidly diffuses into the sample matrix and dissolves the material to be extracted. The dissolved extractant is swept from the extraction vessel into a separation vessel that is held at lower pressure so that the extractant precipitates out from the reduced pressure solvent, due to solubility change with decreasing density (with decreasing pressure). The solvent may then be re-compressed and recycled, or discharged to waste/atmosphere, depending upon the solvent employed.

Extraction systems in use today for recovery of valuable extractants from botanical matrices exhibit a number of drawbacks and inefficiencies. For example, conventional heating strategies fail to provide a uniform axial temperature gradient across the extraction chamber. Furthermore, conventional extractant collection systems fail to provide optimal precipitation conditions for dissolved components and fail to properly accommodate for rapid liquid to gas expansion of the liquid when it exits the pressurized separation chambers, and therefore can experience explosive decompression and solvent solidification during solid extractant collection.

In addition, current systems are limited by vessel volume and the native potency of the product occupying the vessel volume. Current systems also fail to provide alternative means and methods for solvent exchange and or mass transfer between the supercritical fluid and the sample.

Current systems fail to properly account for gaseous solvent disposal, and instead either directly release to atmosphere without treatment or containment, or attempt to recycle the solvent for further use without first removing contaminants entrained in the solvent from the extraction process.

Typical extractant collection techniques expose the extractant to uncontrolled atmospheric conditions, which can result in contamination of otherwise pure recovery. Other drawbacks and inefficiencies of conventional botanical extraction systems involve the lack of selectivity beyond the usual parameters of temperature and pressure and solvent type. Furthermore, conventional systems fail to offer a means to localize precipitation in the collection and or recycling systems thus leading to inefficient precipitation or cross contamination.

SUMMARY OF THE INVENTION

By means of the present invention, extraction of oils and other constituents from botanical matrices may be accomplished in a safe and efficient manner. The extraction system and methods of the present invention isolate botanical constituents through fractionalized separation with a common collection vessel that is adapted to recover precipitate from each of a plurality of separation chambers. Moreover, solvent fluid may be used, disposed of, or reused, as desired by the system operator.

In one embodiment, a method for preparing a botanical oil includes diffusing a supercritical fluid solvent into a botanical sample matrix to form a process fluid that includes the supercritical fluid solvent and an extractant. The process fluid is then depressurized to a first separation pressure in a first separation chamber, wherein at least a portion of the extractant precipitates from the process fluid. The precipitated extractant is then collected from the first separation chamber through a lumen of a flexible collection hose that removably fluidically connects the first separation chamber to a collection chamber in a collection vessel. The collection chamber is maintained at a collection pressure that is less than the first separation pressure. The method further includes delivering thermal energy to the flexible hose to an extent sufficient to counteract expansion cooling of the process fluid passing through the flexible hose to the collection chamber.

In another embodiment, the temperature of the extractor may be independently controlled from the inlet fluid temperature such that the inlet fluid temperature may be adjusted to eliminate axial thermal gradients inherent with uniformly heated (i.e. jacketed and non zoned) heater elements.

Another method for preparing a botanical oil includes diffusing a supercritical fluid solvent into a botanical sample matrix to form a process fluid including an extractant dissolved in the supercritical fluid solvent. The process fluid is depressurized to a first separation pressure in a first separation chamber, wherein as least a portion of the extractant precipitates from the process fluid. The process fluid is then conveyed from the first separation chamber through a valve to further depressurize the process fluid to a transfer pressure in a transfer line. Thermal energy is delivered to the transfer line to an extent sufficient to counteract expansion cooling of the process fluid passing through the transfer line to a waste chamber in a waste vessel, wherein the waste chamber is maintained at a waste pressure that is less than the first separation pressure.

Another method for preparing a botanical oil includes diffusing a supercritical fluid solvent into a botanical sample matrix to form a process fluid including an extractant dissolved in the supercritical fluid solvent. The process fluid is depressurized to a first separation pressure in a separation chamber, wherein as least a portion of the extractant encounters a cooler inside said chamber for localized precipitation of the extractant from the process fluid.

Another method of the present invention for preparing a botanical oil includes first diffusing a non supercritical solvent into a botanical sample matrix to form a process fluid including an extractant dissolved in the non supercritical fluid solvent. The process fluid is then exposed to a porous solid phase extraction media as is commonly known in the art. Desirable process components adsorb or absorb into the porous solid phase extraction media. The media is then removed from the non supercritical solvent by filtration and is subsequently extracted by diffusing a supercritical fluid over the solid phase extraction media. The resulting process fluid containing the desired material is subsequently conveyed to a first separation chamber and is precipitated and collected as otherwise described herein.

In yet another method of the present invention, a process fluid including an extractant encounters a first chamber for precipitation of at least a portion of the extractant. Remaining process fluid may be conveyed to a second chamber having solid phase extraction material disposed therein. The dissolved components in the process fluid encounter the solid phase material and the components of that process fluid may at least partially sorb into and onto the solid phase material, leaving the process fluid containing fewer soluble components. The pressure in this second chamber is then increased to elute the sorbed components from the solid phase material.

Another method of the present invention for preparing a botanical oil includes first diffusing a non supercritical solvent that is immiscible with the supercritical solvent into a botanical sample matrix to form a process fluid including an extractant dissolved in the non supercritical fluid solvent. The process fluid is then pumped continuously or discontinuously into a high pressure chamber where it may be exposed to supercritical fluid bubbles that may be moving counterflow to the process fluid. The dissolved components may preferentially diffuse into the supercritical fluid bubbles. Subsequently, the bubbles are conveyed to a collection chamber as otherwise described herein as a process fluid.

Another method of the present invention for preparing a botanical oil or exchanging a solvent includes first diffusing a non supercritical solvent that is immiscible with a supercritical solvent into a botanical sample matrix to form a process fluid including an extractant dissolved in the non supercritical fluid solvent. The process fluid is then pumped into a chamber where it is exposed to solid phase extraction media. A downstream detector monitors the loading of the solid phase extraction bed. When breakthrough of the solute is obtained as detected by the detector, the process fluid may be shunted to a second chamber containing unsaturated and cleaned solid phase extraction media, such that the components in the process fluid may continue to be sorbed onto the fresh media. Simultaneously, the spent extraction media in the first chamber may be desorbed by a supercritical cleaning fluid to form a secondary process fluid, which may then be conveyed to one or more collection chambers for precipitation of collected components. Direction of flow may be important in this case. A packed bed or a fluidized bed may be utilized as the extraction media, depending on the ability of a fluid pump to reach the specified flow rates at the max pressure of the pump.

An extraction system for preparing a botanical oil includes a botanical sample, a solvent fluid source, a mechanism for altering the solvent fluid to its supercritical state, and a pump for motivating the solvent fluid. The system further includes an extraction chamber for containing or introducing said botanical sample to a supercritical solvent fluid, and diffusing the supercritical solvent fluid into the botanically derived sample to form a process fluid including an extractant dissolved in the supercritical solvent fluid. A separation chamber is fluidically connected to the extraction chamber through a restrictor that is capable of maintaining the extraction chamber at an extraction pressure that exceeds a separation pressure in the separation chamber. A plurality of thermal control mechanisms delivers or removes thermal energy to at least one of the separation chamber and or the process fluid at a location downstream from the valve, wherein at least a portion of the separation chamber is maintainable at a separation temperature. A cooler having one or more cooling elements is disposed in the separation chamber for inducing localized precipitation of the extractant from the process fluid at and adjacent to the one or more cooling elements, which are maintainable at a cooling temperature that is lower than the separation temperature.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible embodiments of the invention. Other embodiments and aspects of the invention are recognized as being within the grasp of those having ordinary skill in the art.

For the purposes of describing the apparatus of the present invention, the terms "up", "down", "horizontal", "vertical", "above", "below", "proximal", "distal", or similar related terms may be used herein to describe the component parts of the apparatus and their relative positions. Such terms are used for convenience in reference to the attached drawing figures, but should not be interpreted as limiting the scope of the present invention.

Example embodiments of the present invention are illustrated in the drawings, with each example embodiment being capable of conveying a solvent fluid into contact with a sample to dissolve an extractant, with the mixture of the extractant and the solvent fluid forming a process fluid for eventual recovery of the extractant in a separation from the solvent fluid. In some embodiments, the sample may be a botanical material, with the solvent fluid dissolving one or more substances naturally found in the botanical material. The natural substances form at least a portion of the extractants, and may include oils and waxes that may find application separate and distinct from the botanical materials. Other sample materials, including solid phase extraction materials that are laden with sorbed botanical extractants, reaction by-product material, or sample laden solvent systems that are immiscible with a supercritical or non-supercritical fluid in its process form are also contemplated as being useful in the extraction system and methods of the present invention.

While a variety of solvent fluids may be employed in the extraction system and methods of the present invention, solvent fluids that may reach a supercritical phase at relatively low temperatures, as well as solvent fluids with little or no environmental toxicity are preferred. Example solvent fluid that are well adapted for botanical extractions at less than 100° C. are carbon dioxide and butane, which are well-known solvents for supercritical fluid extractions.

Figure 1:
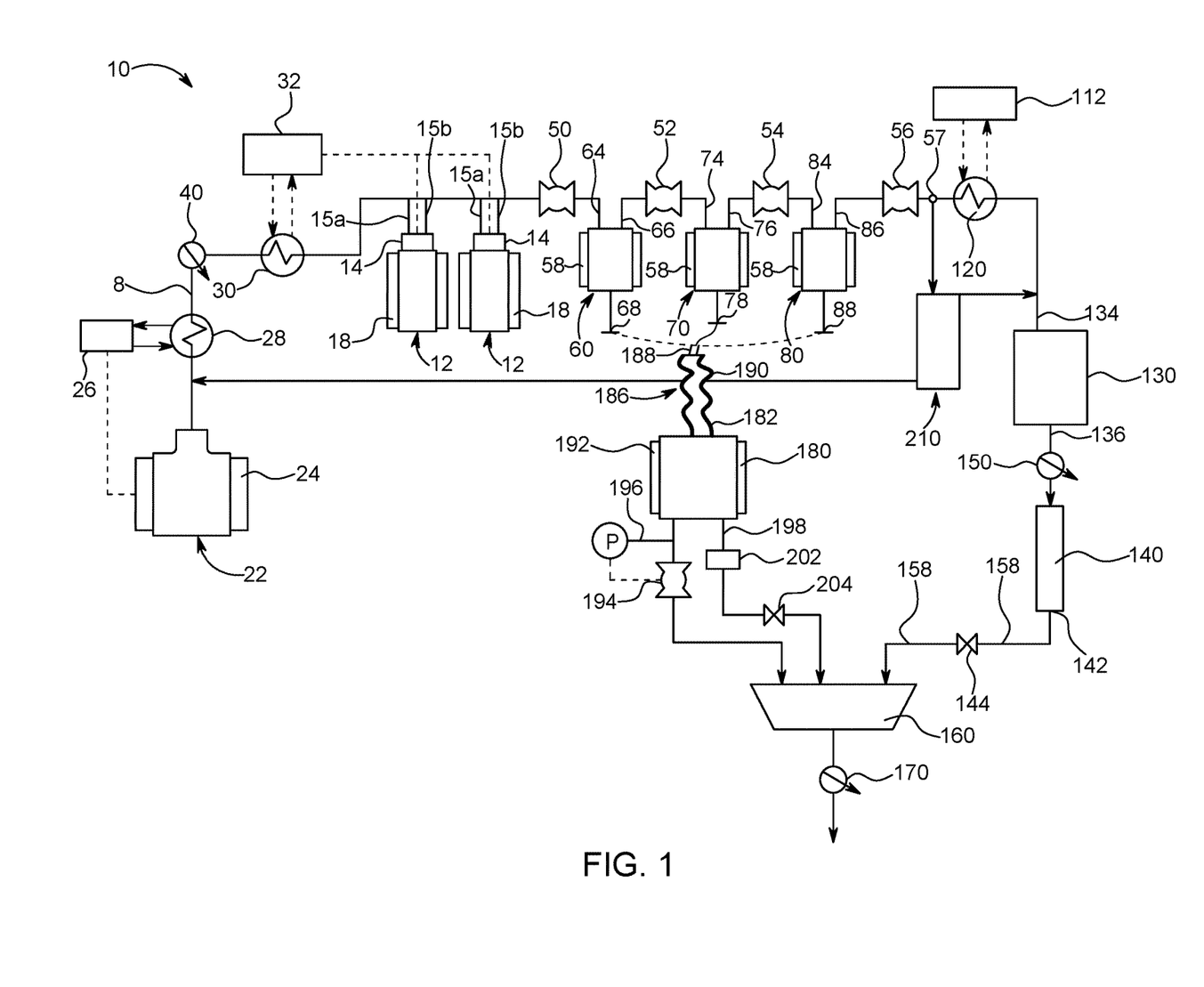
FIG. 1 is a schematic diagram of an extraction system of the present invention.

An example extraction apparatus 10 of the present invention is illustrated in FIG. 1 as a schematic diagram. Extraction system 10 may be configured for performing extractions upon solid or liquid samples, and is most commonly employed for extraction of soluble substances from solid sample matrices. Example solid sample matrices include raw or processed botanical materials such as stems, leaves, skins, roots, flowers, seeds, and the like or solid phase extraction materials that have been pre sorbed with sample. Liquid examples of extraction samples include immiscible or partially miscible solvents such as water or salt water. The sample materials may be placed in one or more extraction vessels 12 that may have one or more removable caps 14 for access into respective extraction chambers 16 in which solubilization of the targeted extractants may be performed. The environment within extraction chamber 16 may be uniformly or non-uniformly controlled to best suit the extraction parameters of a particular solvent/sample combination. Typically, the environment in extraction chambers 16 is maintained at elevated temperature and pressure, particularly in the case of supercritical fluid extraction, wherein the solvent or solvents are desirably maintained in a supercritical state for optimal diffusion into the sample matrix and solubility. Extraction chamber 16 may be maintained at an elevated temperature with one or more heating systems, such as extraction vessel thermal jackets 18 that may be arranged to maintain and/or control temperature within extraction chamber 16 at least above a minimum threshold temperature. In some embodiments, extraction chamber 16 may be maintained at a processing temperature that exceeds the critical temperature ($T_c$) of the solvent for its supercritical phase. In the case of supercritical carbon dioxide solvent, its critical temperature is 31° C., wherein extraction chamber 16 may preferably be maintained at a processing temperature above 31° C., and preferably between about 35-100° C. Caps 14 have disposed within them one or more inlets for one or more fluids for solvent fluid 20 and a process fluid laden with analyte. The temperature environment in extraction chamber 16 may also or instead be regulated through the temperature of solvent fluid 20 conveyed from a solvent fluid source 22 to extraction vessels 12 through a process line 8. Prior to being delivered to extraction chamber 16, thermal energy may be supplied to, or removed from, solvent fluid 20 at a heat exchanger 30 that is coupled to a first thermal regulator unit 32. In typical embodiments, thermal regulator 32 is programed to elevate the temperature of solvent fluid 20 to a processing temperature ($T_p$) that exceeds its critical temperature ($T_c$). In the case that solvent fluid 20 has been pressurized at a first pump 40 to a processing pressure ($P_p$) that exceeds the critical pressure ($P_c$) of the solvent fluid, such heating of solvent fluid 20 can compress solvent fluid 20 to its supercritical condition. As stated above, supercritical fluid extractions provide many advantages, and is a preferred operation of extraction system 10 of the present invention.

In the example illustrated embodiment, solvent fluid 20 may be stored at solvent fluid source 22, which may be a reservoir such as a tank or canister that may be pressurized. In some embodiments, solvent fluid source 22 may include a thermal jacket 24 for delivering or withdrawing thermal energy from solvent fluid 20 at solvent fluid source 22. In some embodiments, thermal jacket 24 may withdraw thermal energy from solvent fluid 20 to aid in cooling solvent fluid 20 within a pressurized canister or tank of solvent fluid source 22 to establish or maintain solvent fluid in a liquid state. Solvent fluid 20, in a liquid state, is substantially incompressible to aid in pumping solvent fluid 20 through process line 8. A second thermal regulator unit 26 may be coupled with a heat exchanger 28 for thermally regulating solvent fluid 20 in process line 8. Second thermal regulator unit 26 may also or instead thermally regulate thermal jacket 24 to add or remove thermal energy to or from solvent fluid 20 at solvent fluid source 22. In some embodiments, second thermal regulator unit 26 may operate with one or both of heat exchanger 28 and thermal jacket 24 to remove thermal energy from solvent fluid 20 to assist in obtaining or maintaining a liquid state of solvent fluid 20 for delivery of solvent fluid 20 in a liquid state to pump 40. Heat exchanger 28 may cool solvent fluid 20 to a temperature of between about −10-20° C. In other embodiments, thermal energy may be added to solvent fluid 20 by second thermal regulator unit 26 to raise the temperature and pressure of solvent fluid 20 within process line 8 sufficiently to optimize the state of the fluid for pump 40.

Thermal regulator units 26, 32 may be communicatively linked to thermocouples (not shown) measuring the temperature of a material or environment, such as solvent fluid 20 and extraction chambers 16. Feedback from such thermocouples drive thermal regulator units 26, 32 to control the extent of thermal energy delivery or removal through, for example, heat exchangers 28, 30. In some embodiments, it is desired to elevate the temperature and pressure of solvent fluid 20 to its supercritical state, which, in the case of carbon dioxide is above its critical temperature of 31° C. and its critical pressure of about 1,083 psi.

In some embodiments, thermal regulator units 26, 32 may supply or remove thermal energy via a thermal regulation fluid in a circulation conduit. The thermal regulator units 26, 32 may be arranged to recirculate the thermal regulation fluid through respective heat exchangers 28, 30 and/or thermal jackets 18, 24. The thermal regulation fluid may be any useful fluid for transferring thermal energy, such as liquids and liquid/gas mixtures.

Solvent fluid 20 may be delivered to the one or more extraction vessels 12 through process line 8, and preferably in a supercritical state when the appropriate valves 21 are opened, either manually or automatically by a controller. A sample, such as botanical material, may be placed in extraction chamber 16 for exposure to solvent fluid 20. When source outlet valve 21a, and extraction inlet valve 21b and/or 21c are opened, solvent fluid may be passed through a filter 23 at a point prior to delivery to extraction vessels 12. Flow of solvent fluid 20 may be regulated by an array of valves, including extraction vessel inlet valves 21b, 21c, bypass valve 21d, and outlet regulator valves 21e, 21f. Such valves may be manually or automatically controlled so that solvent and process fluid flow is desirably routed through extraction system 10. In typical processes, only one extraction vessel 12 is "online", receiving solvent fluid for extraction, while the remaining one or more extraction vessels 12 are "offline" for cleaning and re-fueling. In another embodiment, both inlet valve and outlet valves are open so that solvent fluid 20 may elute through extraction vessels 12. The array of valves may also be employed in reverse-flow operations.

In some embodiments, it is preferred to maintain solvent fluid 20 in a supercritical state for desirable diffusion into the sample matrix, and uptake of the extractant. In order to perform supercritical fluid extraction, extraction chambers 16 are preferably maintained at a processing temperature and pressure exceeding the critical temperature and pressure of the solvent fluid. A first back pressure regulator 50 is provided in process line 8 downstream from extraction vessels 12 and a one-way check valve 49 to maintain upstream pressures up to a threshold breakthrough pressure at which a mixture of solvent fluid 20 and the extractant (process fluid) may be passed along process line 8 to a first separation chamber 60. In this manner, first back pressure regulator 50 maintains sufficient pressure in extraction chambers 16 while simultaneously downregulating pressure in process line 8 for passage into first separation vessel 60. First backpressure regulator 50 is an example of several backpressure regulators that may be utilized in connection with extraction system 10, and generally comprise a one-way or two-way valve to control passage of process fluids therethrough. In some embodiments, the backpressure regulators may include an orifice that sealingly engages with a spring-driven closure member, wherein the spring force on the closure member may be adjusted manually or automatically to vary the level of pressure held back by the valve. In a first operating mode to extract and separate extractants from a sample matrix, first backpressure regulator 50 may be adjustably arranged to maintain a pressure within one or both of extraction chamber 16 between 0-10,000 psi, and more preferably between about 3,000-5,000 psi. First backpressure regulator 50 coordinates with process line 8, which conveys process fluid into fluidic communication with one or more extraction chambers 16 for an extraction process on a sample prior to conveyance to a first separation vessel 60. In particular, process line 8 conveys solvent fluid 20 into fluid communication with one or more extraction chambers 16 through respective inlets 15a of extraction vessels 12.

Solvent fluid 20 preferably diffuses into the sample matrix in one or more extraction chambers 16 to dissolve extractants therefrom. A mixture of solvent fluid 20 and the extractant forms a process fluid, which may flow out from extraction chamber 16 through respective outlets 15b. Inlet and outlet fluid flow to and from one or more extraction chambers 16 may be controlled by valves or other structure of or in connection with process line 8. Pressure upstream from first backpressure regulator 50 exceeding an assigned threshold pressure opens first backpressure regulator 50 to permit passage of process fluid therethrough and into first separation chamber 62 of vessel 60 through inlet 64.

In some embodiments, an extractor isolation valve 51 may be included as a manually or automatically-operated valve to ensure fluid flow only along a desired direction in process line 8. In particular, it is desired at the end of an extraction process that the extraction vessels be isolated from the collection system which may undergo collection and cleaning processes separately from the operation of extraction vessels 12. In this example, extractor isolation valve 51 may be selectively operated to prevent backward fluid flow along process line 8 into extraction vessels 12.

One or more of pressure and temperature in first separation chamber 62 may be monitored, maintained, and/or controlled to desired parameters for separation or fractionalized separation of the extractant from the process fluid. In the embodiment of extraction system 10 illustrated in FIG. 1, a plurality of separation vessels 60, 70, 80 may be arranged in series and/or parallel to desirably separate the extractant from the process fluid. Extraction system 10 may employ a fractionalized separation of extractants, wherein a series of a plurality of separation vessels 60, 70, 80 have sequentially descending internal pressures, such that the process fluid correspondingly has sequentially declining capacity to maintain the extractants in solution. Consequently, at least a portion of the one or more extractants precipitate out of the process fluid as its pressure sequentially declines from first separation vessel 60, to second separation vessel 70, and to third separation vessel 80. Pressures within each of the separation vessels 60, 70, 80 may be regulated by respective backpressure regulators 52, 54, 56 in process line 8 downstream from the respective separation vessel. In this arrangement, each successive separation vessel is held at a lower pressure in its respective separation chamber. In some embodiments, each of separation chambers 62, 72, 82 are maintained at processing pressures that exceed the vapor pressure of the solvent fluid 20. Example processing pressures in separation chambers 62, 72, 82 exceed 250 psi, and more preferably exceed 750 psi. In other embodiments, however, one or more of the separation chambers may be provided with a processing pressure that is less than the critical pressure of the solvent fluid 20. Such an approach to separation of the extractant from the process fluid is known as fractionation.

In some embodiments, one or more separation vessels 60, 70, 80 may be heated or cooled so that the respective separation chambers 62, 72, 82 may be maintained at desired temperature set points. In some embodiments, each separation chamber 62, 72, 82 may be maintained at a processing temperature that exceeds the critical temperature of solvent fluid 20. In other embodiments, however, one or more of separation chambers 62, 72, 82 may have a processing temperature that is equal to or less than the critical temperature of solvent fluid 20. Thermal energy may be supplied to a respective separation vessel 60, 70, 80, and transferred to a respective separation chamber 62, 72, 82 through walls of the separation chambers by a thermal jacket 58. It is to be understood that a variety of mechanisms may be employed to generate and/or deliver thermal energy at thermal jacket 58, such as with a thermal regulation fluid, electrical resistors, convective and radiant heating elements, and the like.

Figure 2:
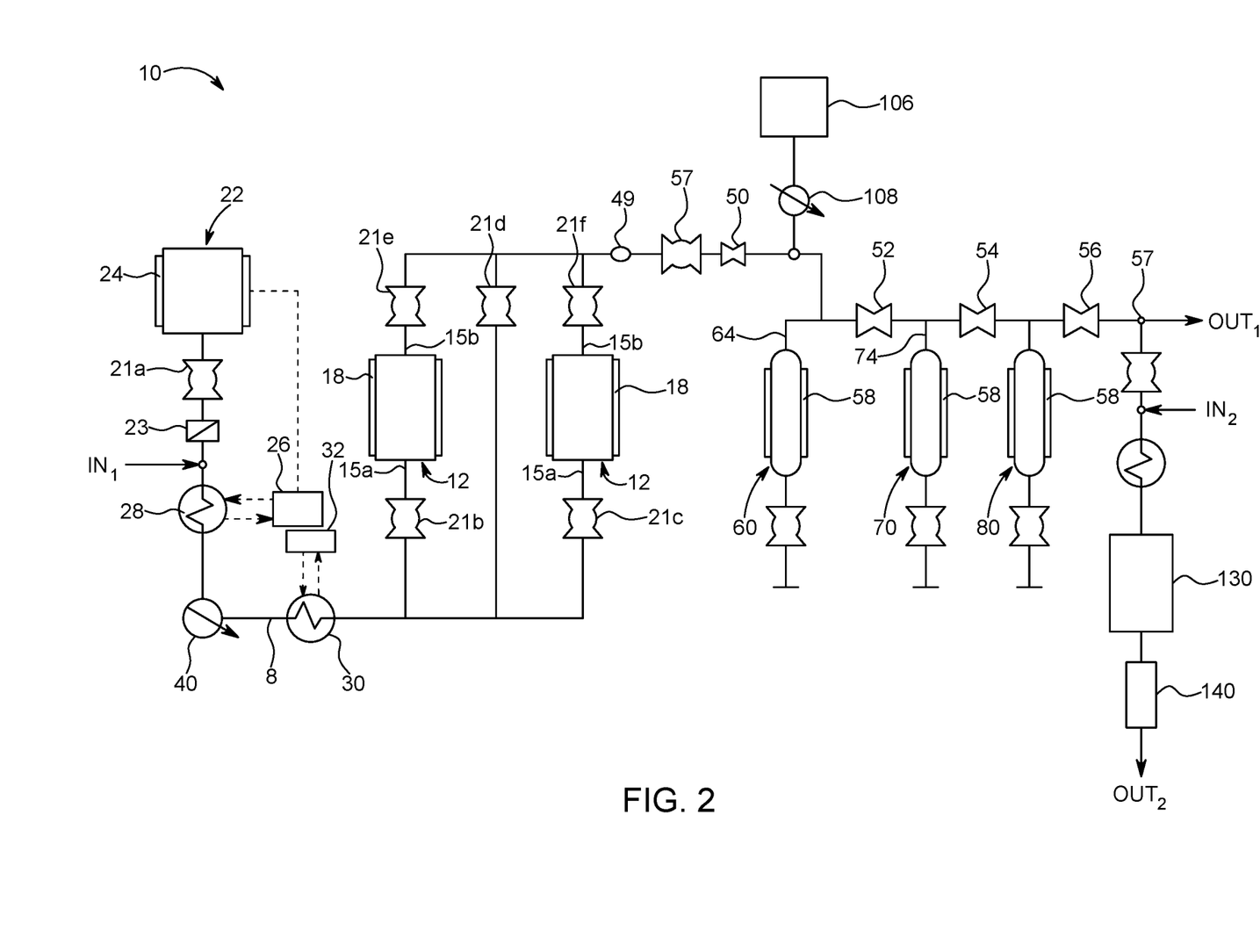
FIG. 2 is a schematic diagram of an extraction system of the present invention.
Figure 3:
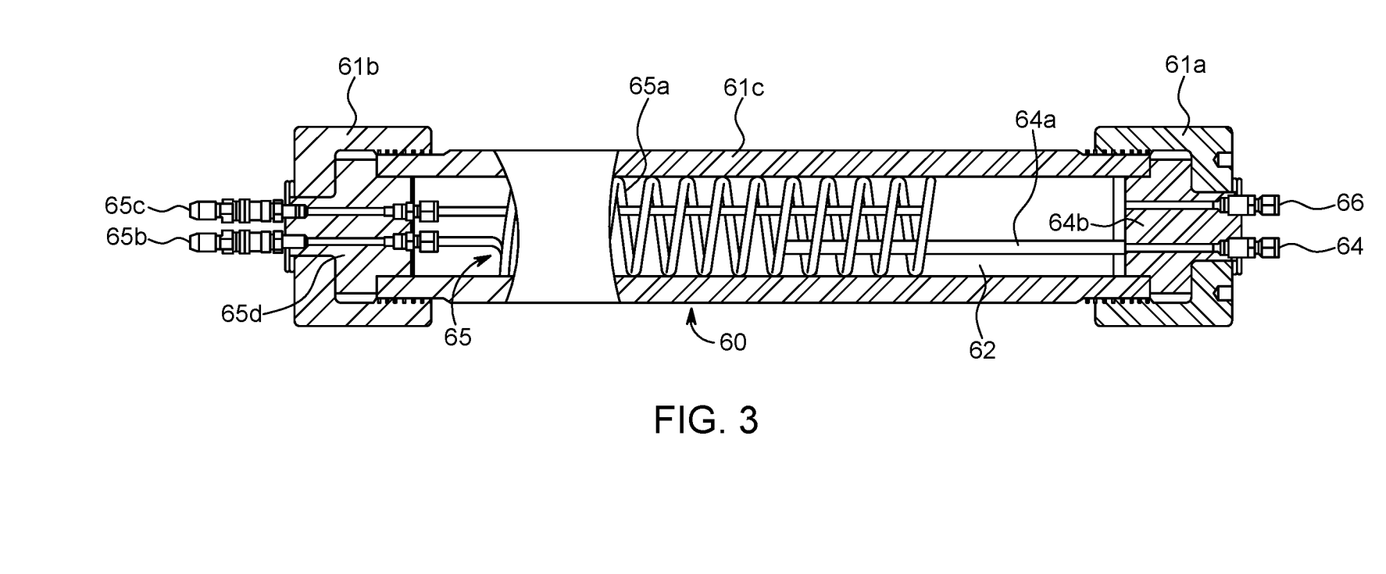
FIG. 3 is a cross-sectional view of a portion of an extraction system of the present invention.

An example separation vessel 60 of the present invention is illustrated in the cross-sectional view of FIG. 2. Separation vessel 60 includes first and second end caps 61a, 61b, securable to a housing 61c. In some embodiments, at least one of first and second end caps 61a, 61b may be removably securable to housing 61c through, for example, a threadable engagement. Separation chamber 62, defined by separation vessel 60, is provided for recovering precipitate from the process fluid as the process fluid is depressurized from an upstream portion of extraction system 10. The process fluid may be conveyed into separation chamber 62 through process fluid inlet 64 fluidically connected to an inlet tube 64a that is connected to, or extends through a process fluid head 64b secured between first end cap 61a and housing 61c. In like fashion, the process fluid may be conveyed out from separation chamber 62 through process fluid outlet 66, which is fluidically connected to a tube or channel through process fluid inlet head 64b.

To facilitate or enhance precipitation of dissolved constituents in the process fluid, separation vessel 60 may preferably include a cooler 65 for establishing a locally cooled environment within separation chamber 62. As described above, the separation vessels 60, 70, 80 may be heated as desired to at least partially counteract the expansion cooling of the process fluid as it is depressurized from an upstream higher pressure condition. Consequently, separation chambers 62, 72, 82 may have an elevated temperature environment, including temperatures exceeding the critical temperature for a supercritical solvent fluid. Cooler 65 is preferably arranged and operated not to cool an entirety of separation chamber 62, but rather to establish a localized cooled environment at and adjacent to one or more physical structures of cooler 65. In the illustrated embodiment, cooler 65 may include tubing 65a that is arranged to convey a cooling fluid within a lumen thereof in and out of separation chamber 62. Tubing 65a may be provided in any convenient configuration, such as a coiled configuration to maximize available surface area of tubing 65a within separation chamber 62. Tubing 65a is fluidically connected to a cooling fluid inlet 65b and a cooling fluid outlet 65c, which may establish a closed-loop path in separation chamber 62. Tubing 65a may be fluidically connected to cooling fluid inlet and outlet 65b, 65c through a cooling fluid connection head 65d. In some embodiments, the cooling fluid conveyed through tubing 65a may be liquid water at a temperature of between about 1-20° C., and more preferably between about 1-5° C. Liquid water may be selected for its desirable thermal transfer properties, though it is contemplated that a variety of other cooling fluids may be employed to reduce and/or maintain the temperature of cooler 65.

Cooler 65 is intended to provide a localized reduced temperature environment within separation chamber 62. For the purposes hereof, the term "localized cooling environment" is intended to a mean a zone of reduced temperature at and adjacent to the one or more cooling elements of cooler 65 in separation chamber 62. In the example embodiment illustrated in FIG. 2, the local cooling environment may be at or adjacent to the coiled tubing 65a in separation chamber 62. It is to be understood that a temperature gradient may likely be established extending from the one or more cooling elements of cooler 65, according to the differential temperature between the cooling elements, such as tubing 65a, and the temperature of the process fluid in separation chamber 62. In typical embodiments, tubing 65a may be fabricated from a thermally conductive material to more efficiently transfer heat from the localized cooling environment to the cooling fluid. By reducing the temperature in the localized cooling environment, process fluid exposed to the localized cooling environment is reduced in temperature, thereby inducing precipitation of extractants from the process fluid. One or more of separation vessels 60, 70, 80 may include a cooler 65 for inducing precipitation of extractants out from the process fluid.

In some embodiments, the process fluid from extraction vessels 12 may pass through first backpressure regulator 50 in process line 8 and into first separation vessel 60 for at least partial separation of the extractants from the process fluid. Because the process fluid moves to a lower pressure environment downstream from first pressure regulator 50, adiabatic expansion cooling of the process fluid may be counteracted with thermal energy supplied to one or more of separation chamber 62 and process fluid. Various mechanisms may be employed to supply such thermal energy, including a thermal jacket 58. Remaining process fluid exits from separation chamber 62 through outlet 66 to pass through second backpressure regulator 52 in process line 8, and subsequently into separation chamber 72 of second separation vessel 70 through inlet 74. Because second separation chamber 72 is maintained at a processing pressure that is lower than the processing pressure of separation chamber 62, further extractant may precipitate out from the process fluid. This process is repeated with the remaining process fluid directed from second separation chamber 72 to third separation chamber 82 in third separation vessel 80. It is desired that an appropriate sequence of pressure and temperature in the separation vessels 60, 70, 80 are provided to recover as much extractant as possible in precipitate form. Separation vessels 60, 70, 80 may optionally include cooler 65 disposed within respective separation chambers to aid in localized precipitation. The cooler 65 may be optionally disposed in chamber 80 to reduce the amount of terpenes that exit the system.

The illustrated embodiment of extraction system 10 provides a waste recovery system and method in order to safely and efficiently recover solvent fluid 20 and, separately, any remaining extractants contained in the process fluid that exits from the last separation vessel 80. Typically, such process fluid contains some amount of extractants that have a relatively high solubility in solvent fluid 20. An example extractant component that is often times dissolved into the solvent fluid 20 for botanical samples are terpenes, which are a large group of volatile unsaturated hydrocarbons found in the essential oils of plants. Terpenes, however, can have value as flavoring and fragrance components to optionally recombine with the precipitated extractants, namely the botanical oils separated from solvent fluid 20 in separation vessels 60, 70, 80. Therefore, it may be of value to provide a system and method for recovering remaining extractants in the process fluid, as well as to recover the solvent fluid, since conventional venting of the solvent fluid from process line 8 may introduce workplace hazards for toxic or otherwise harmful gasses to which operators of extraction system 10 may otherwise be exposed.

Figure 4:
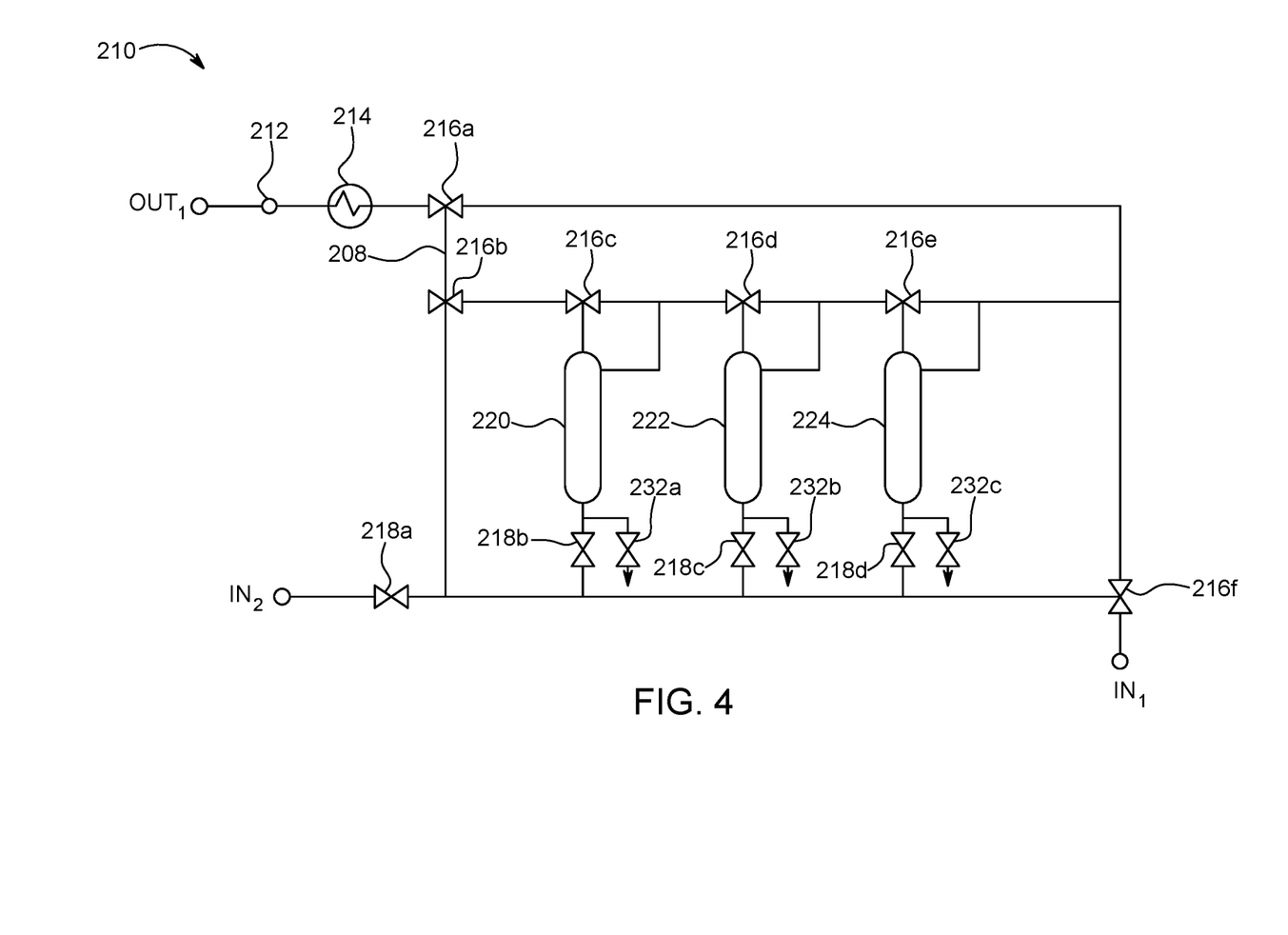
FIG. 4 is a schematic diagram of a portion of an extraction system of the present invention.

Extraction system 10 may optionally include a solvent fluid recycling system for recovering solvent fluid from the process fluid exiting from third separation vessel 80 through back pressure regulator 56. In such embodiments, the process fluid may be shunted at a valve or other diverter 57 to "outs" to recycling system 210. An example recycling system 210 is schematically illustrated in FIG. 4, wherein the process fluid enters recycling system 210 through a one-way valve, such as a check valve 212 at a pressure that is less than the pressure maintained in collection chamber 82, but is nevertheless preferably still at an elevated pressure and temperature to keep the process fluid in a liquid state. Inlet pressure is preferably set to accommodate and maintain an inlet pump pressure of at least 750 psi. To begin the process of recovering the solvent fluid separate and apart from any constituents collected during the extraction process, recycling system 210 may initially reduce the temperature of the process fluid at a heat exchanger 214. In some embodiments, heat exchanger 214 may reduce the temperature of the process fluid to an initial recycling temperature of between about −20-20° C., and more preferably between about −10-10° C. The cooled process fluid may then be directed through a recycling line 208 through an array of three-way valves 216a-216f to appropriately route the process fluid through the separation and filtration components of recycling system 210. In some embodiments, the flow is diverted in a reverse flow fashion to remove any filter cake buildup that may have lodged on the outlet filters disposed in filter vessels 222 and 224. In this case, the fluid enters filter vessel 224 through outlet tube and exits through the inlet tube. Typical operation would operate in reverse mode only long enough to lower the respective pressures in each vessel that occurs when running in forward mode at a given flow rate.

In some embodiments, a coalescer vessel 220 is employed in similar fashion to collection vessels 60, 70, 80, wherein a reduced pressure environment within coalescer vessel 220 induces precipitation of contaminants out from the solvent fluid. In some embodiments, a cooler 65 may be employed in coalescer vessel 220 to promote localized precipitation of extractants/dissolved constituents from the process fluid. Remaining process fluid may flow from the one or more coalescer vessels 220 to one or more filter vessels 222 which contain one or more filters to further separate extractants or other constituents from the process fluid. In some embodiments, filter vessels 222 may include filters having a sieve or pore size of less than 500 micrometers, and more preferably less than 100 micrometers.

Process fluid passing through the filters of the one or more filter vessels 222 may, in some embodiments, be conveyed through one or more secondary filter vessels 224, which may include one or more additional sieve filters, and/or fluidized bed separation chambers for further purifying solvent fluid from the process fluid. The one or more separation chambers that may optionally be included in secondary filter vessel 224 may include a carbon bed for separating residual extractants from the process fluid, so as to purify the solvent fluid from the process fluid.

Valve 216f, which may be a three-way valve, may be manually or automatically operated to selectively route the recovered solvent fluid back into extraction system 10 at either the beginning of the extraction process at "in₁", or to a venting process beginning at "in₂" through a vent valve 218a. Further vent valves 218b-218d may be provided for venting recovered solvent fluid through recycling line 208 from the respective one or more coalescer vessels 220, one or more filter vessels 222, and one or more secondary filter vessels 224. Recycling system 210 may further include exit valves 232a-232c for recovering constituents separated from the process fluid in respective ones of the one or more coalescer vessels 220, one or more filter vessels 222, and one or more secondary filter vessels 224.

In extraction systems 10 not including the optional recycling system 210, process fluid exiting from back pressure regulator 56 may be directed to a venting system. In order to avoid icing due to adiabatic expansion cooling of the process fluid in process line 8 downstream from backpressure regulator 56, thermal energy may be supplied to the process fluid by a third thermal regulator unit 112, which may be coupled to a heat exchanger 120. In preferred embodiments, heat exchanger 120 may be arranged for delivering thermal energy to process fluid in the process line 8. Heat exchanger 120 may be any of a variety of mechanisms for supplying thermal energy to the process fluid, including, for example, a thermal jacket disposed about process line 8, a thermal regulation fluid in a thermal regulation line adjacent to, or in contact with process line 8, and any other technique useful in delivering sufficient thermal energy to limit or avoid undesired solidification of the solvent fluid during expansion cooling. In some embodiments, heat exchanger 120 may deliver sufficient thermal energy to maintain the process fluid at a temperature of between about −20-100° C., and more preferably between about 0-50° C.

Process line 8 conveys the process fluid to an expansion vessel 130. In some embodiments, an expansion chamber 132 in expansion vessel 130 is at a relatively low pressure, but may be sufficiently pressurized to limit or avoid solidification of at least portions of the process fluid. Example pressure for expansion chamber 132 during collection of process fluid may be at least about 70 psi, and more preferably between 100-200 psi. In such embodiments, a substantial pressure drop across back pressure regulator 56 may exist, which results in substantial expansion cooling of the process fluid. In other embodiments, expansion vessel 130 may be maintained at an elevated processing pressure at least initially, and, following a batch run of extraction of sample, expansion vessel 130 may be vented to the ambient. To maintain an elevated processing pressure in expansion vessel 130, an additional backpressure regulator (not shown) may be included at expansion vessel 130 in fluid communication with expansion chamber 132. Expansion vessel 130 includes an inlet 134 and an outlet 136 in fluid communication with expansion chamber 132. In some embodiments, expansion vessel 130 may include one or more valved outlets for manually or automatically releasing pressure from expansion chamber 132. The reduction of processing pressure in the process fluid may result in some products precipitating out from the process fluid in gas, liquid, or solid form. Expansion vessel 130 may include an access port for removing the precipitated products from expansion chamber 132.

In some cases, certain extractants may remain even after depressurization of the process fluid in expansion vessel 130. Extraction system 10 of the present invention contemplates recovering such remaining extractants by passing gaseous materials through a scrubbing column 140. The gaseous materials may preferably be delivered through scrubbing column 140 under residual pressure in expansion chamber 132, but may instead be evacuated from expansion chamber 132 with a pump 150. In some embodiments, scrubbing column 140 may include a carbon bed for separating residual extractants, such as terpenes, from the process fluid. An example carbon bed useful in adsorbing residual extractants is described in U.S. Pat. No. 9,149,793 herein incorporated by reference. The adsorbed extractants in the scrubbing column 140 may be desorbed in a separate process to recover the isolated extractants, possibly for commercial use thereof. The gas passing through scrubbing column 140 may preferably fluidize the carbon bed against gravitational forces, with the fluidized bed exerting a flow restriction to the gas that may be sufficient to establish a desired back pressure in expansion chamber 132. In some cases, the back pressure developed by the fluidized bed may be sufficient to limit or avoid solidification of the process fluid in expansion chamber 132. An example pressure may be at least 70 psi.

Gas exiting from scrubbing column 140 may be captured to minimize or avoid workplace exposure to the solvent fluid. In some embodiments, one or more suction hoods 160 may be placed in proximity to an outlet 142 of scrubbing column 140 in order to effectively capture effluent gas. Suction hood 160 may be fluidly coupled to an exhaust pump 170 to generate an evacuating force that captures effluent gas from outlet 142 of scrubbing column 140. The captured effluent gas may be piped to a waste container, a recycling facility, or to an exhaust vent positioned in a workplace-safe location to minimize or avoid operator exposure to the effluent gas. In some embodiments, a valved restriction orifice 144 may be positioned in process line 8 between column outlet 142 and suction hood 160 to selectively establish a venturi to accelerate evacuation of fluid to suction hood 160. Restriction orifice 144 may include a slide valve for manually or automatically adjusting an orifice size for restriction orifice 144. A static free conduit or conduit section 158 may be electrically grounded to minimize or avoid static electricity accumulation.

Extraction system 10 may further include a collection vessel 180 that may be employed to collect the precipitated extractants in separation vessels 60, 70, 80. Collection vessel 180 includes an inlet 182 for introducing the precipated extractant (and any other remaining constituents in separation vessels 60, 70, 80) into a collection chamber 184. A flexible collection hose 186 fluidly couples inlet 182 to respective precipitate ports 68, 78, 88 of respective separation vessels 60, 70, 80. Collection hose 186 may include a connection adaptor 188 for selectively connecting to precipitate ports 68, 78, 88, wherein precipitate may be motivated out from chambers 62, 72, 82 into collection chamber 184 through the flexible collection hose 186.

As noted above, separation chambers 62, 72, 82 are typically maintained during a batch separation process at elevated pressures, most often in excess of 750 psi. Pressurized process fluid, including pressurized solvent fluid 20 may typically be present in the separation chambers 62, 72, 82 in addition to the precipitated extractants. Removing the contents of separation chambers 62, 72, 82 involves the transfer of materials from a relatively high pressure environment to a relatively low pressure environment. In the case of carbon dioxide as solvent fluid 20, a pressure drop to pressures below about 75 psi can result in liquid carbon dioxide becoming vapor and solid (icing), wherein the solid carbon dioxide can block outlet piping and create a burst hazard. It is therefore desired that collection chamber 184 be maintained at an elevated pressure during the removal process, and thereafter reduced to low, near ambient, or ambient pressure conditions so that discharge of the contents from the separation chambers 62, 72, 82 may be accomplished in a safe and efficient manner. In some embodiments, collection chamber 184 may be maintained at a pressure that is between a minimum collection pressure and a maximum collection pressure. The minimum collection pressure may be a pressure at which certain conditions may exist for the constituents to be collected from separation chambers 62, 72, 82. Example conditions include material phase (gas, liquid, solid), viscosity, and the like. In some embodiments, a minimum collection pressure of between about 70-1,000 psi, and more preferably between about 120-300 psi may be employed for collection chamber 182. The minimum collection pressure may preferably exceed ambient pressure external to collection vessel 180, and may preferably exceed one standard atmospheric pressure. The maximum collection pressure for collection chamber 182 may be equal to or less than a maximum pressure rating for collection vessel 180. Such maximum pressure rating may include maximum pressure ratings for the vessel itself and/or for seals, valves, closure caps, and the like for collection vessel 180. In other words, the maximum collection pressure may be assigned as a pressure equal to or less than a pressure at which one or more components of collection vessel 180 may fail to contain the contents of collection chamber 184. In some embodiments, collection vessel 180 may have a maximum collection pressure of between about 200-400 psi, and more preferably between about 100-400 psi. A pressure relief valve set at 250 psi is a particular example.

In order to prevent excess cooling from the adiabatic expansion of the contents of separation chambers 62, 72, 82 during collection through collection hose 186 into collection chamber 184, a thermal regulator 190 may be provided to supply thermal energy to collection hose 186 and materials passing therethrough from separation chambers 62, 72, 82 to collection chamber 184. Thermal regulator 190 may comprise any of a variety of thermal transfer devices, such as a thermal jacket, embedded or external electrical resistors, convective and/or radiant ovens, heat guns, and the like. Temperature regulator 190 may preferably be arranged to supply sufficient thermal energy to collection hose 186 in order to limit or avoid adiabatic expansion cooling of materials passing therethrough, such as an extent of adiabatic cooling expansion resulting in solidification of solvent fluid 20.

In some embodiments, collection vessel 180 may also or instead include a temperature regulator 192 to limit or prevent adiabatic expansion cooling due to the depressurization between separation chambers 62, 72, 82 and collection chamber 184. Thermal regulator 192 may, like thermal regulator 190, be any of a variety of thermal devices capable of delivering sufficient thermal energy to collection vessel 180 to avoid or limit adiabatic expansion cooling of materials being depressurized in the transfer from separation chambers 62, 72, 82 to collection chamber 184.

Pressure may be maintained in collection chamber 184 between the minimum collection pressure and the maximum collection pressure by a backpressure regulator 194 and a pressure gauge 196. Backpressure regulator 194 may be manually or automatically adjusted to permit passage of pressurized fluid therethrough only when the pressure in collection chamber 184 exceeds the predetermined maximum collection pressure. Backpressure regulator 194 may be automatically controlled to various pressure set points through communicative connection with a controller (not shown), itself communicatively coupled to pressure gauge 196 for feedback therefrom. Pressurized fluids permitted to pass through backpressure regulator 194 may be collected by suction hood 160 for withdrawal from the area surrounding extraction system 10.

Collection vessel 180 may further include an exit port 198 for reducing pressure in collection chamber 184 below the minimum collection pressure so as to recover as much extractant as possible from the process fluid, and to vent the depressurized process fluid from collection vessel 180. Exit port 198 may be controlled by an automatic or manual valve 202 that may selectively permit depressurization of collection chamber 184. Such depressurization may bring the pressure within collection chamber 184 to ambient pressure conditions, or to a reduced pressure suitable for handling of the collected materials at collection vessel 180. Process fluid vented through exit port 198, and through valve 202 may be recovered at suction hood 160 to remove such materials from the area surrounding extraction system 10. A valved-restriction orifice 204 may be positioned between exit port 198 and suction hood 160 to effectively establish a venturi to accelerate evacuation of fluid to suction hood 160. Restriction orifice 204 may include a slide valve for manually or automatically adjusting an orifice size for restriction orifice 204.

The collection systems of extraction system 10, including the separation chambers, the recycling system, and the waste recovery system may be periodically cleaned to maintain its performance and extend the lifetime of performance of extraction system 10. Cleaning of extraction system 10 reduces or avoids buildup of wax and other material clogging in transfer lines and in collection chambers. In some embodiments, pressurized cleaning material, such as ethanol or other fluid solvent, may be pumped from a reservoir 106 with a cleaning material pump 108. The cleaning material may be directed through separation vessels 60, 70, 80, and optionally through recycling system 210, expansion vessel 130, and separation column 140.

Figure 5:
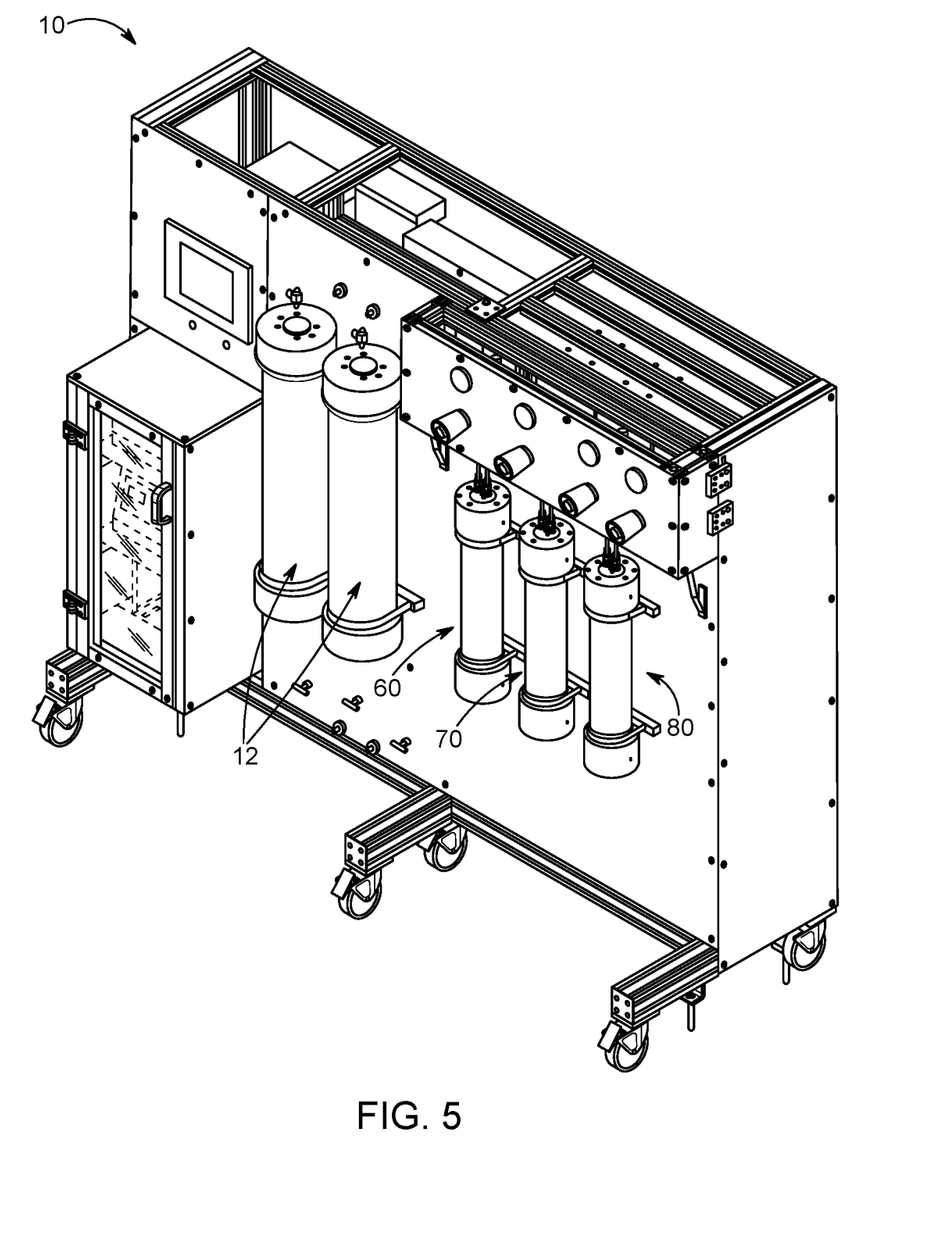
FIG. 5 is a perspective view of an embodiment of an extraction system of the present invention.
Figure 6:
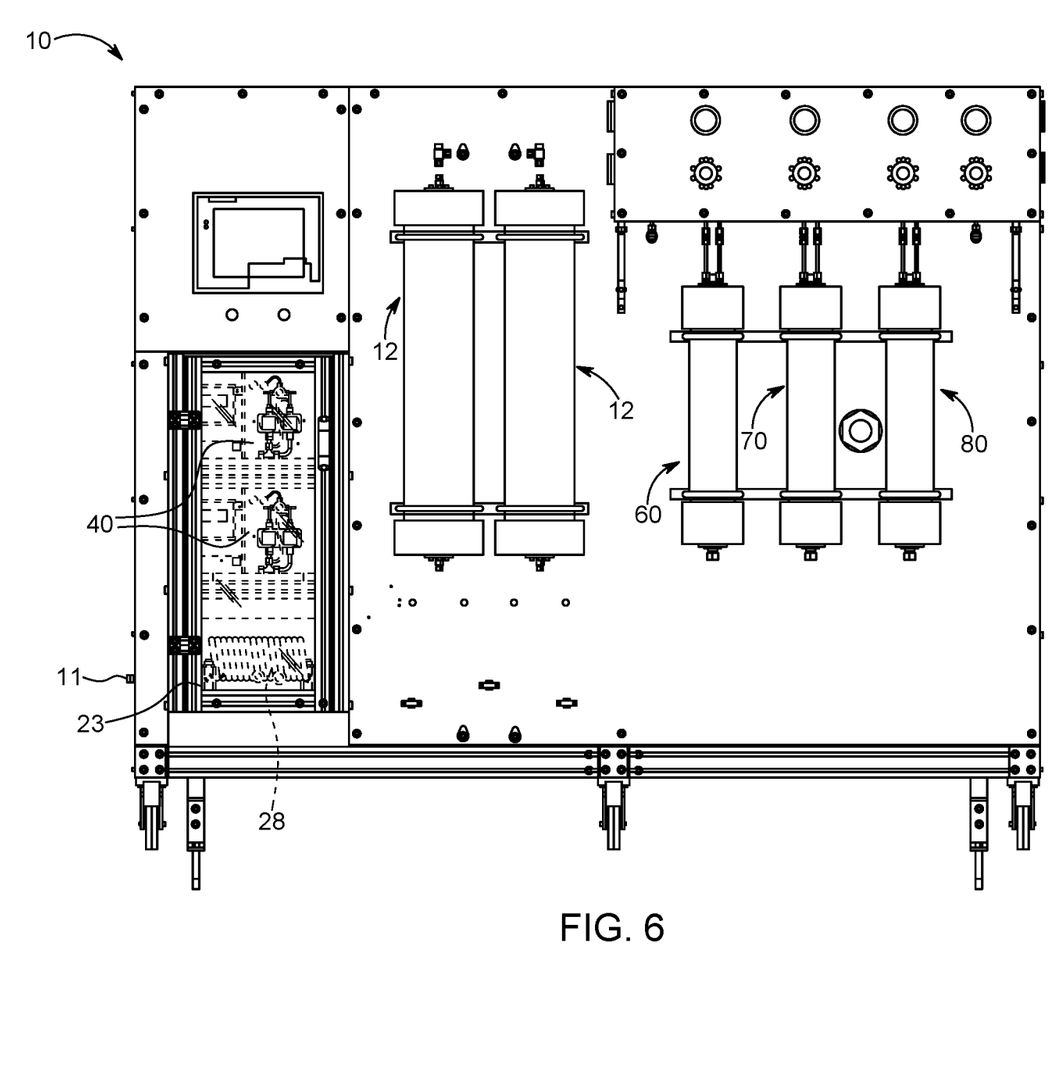
FIG. 6 is a front elevational view of an embodiment of an extraction system of the present invention.
Figure 7:
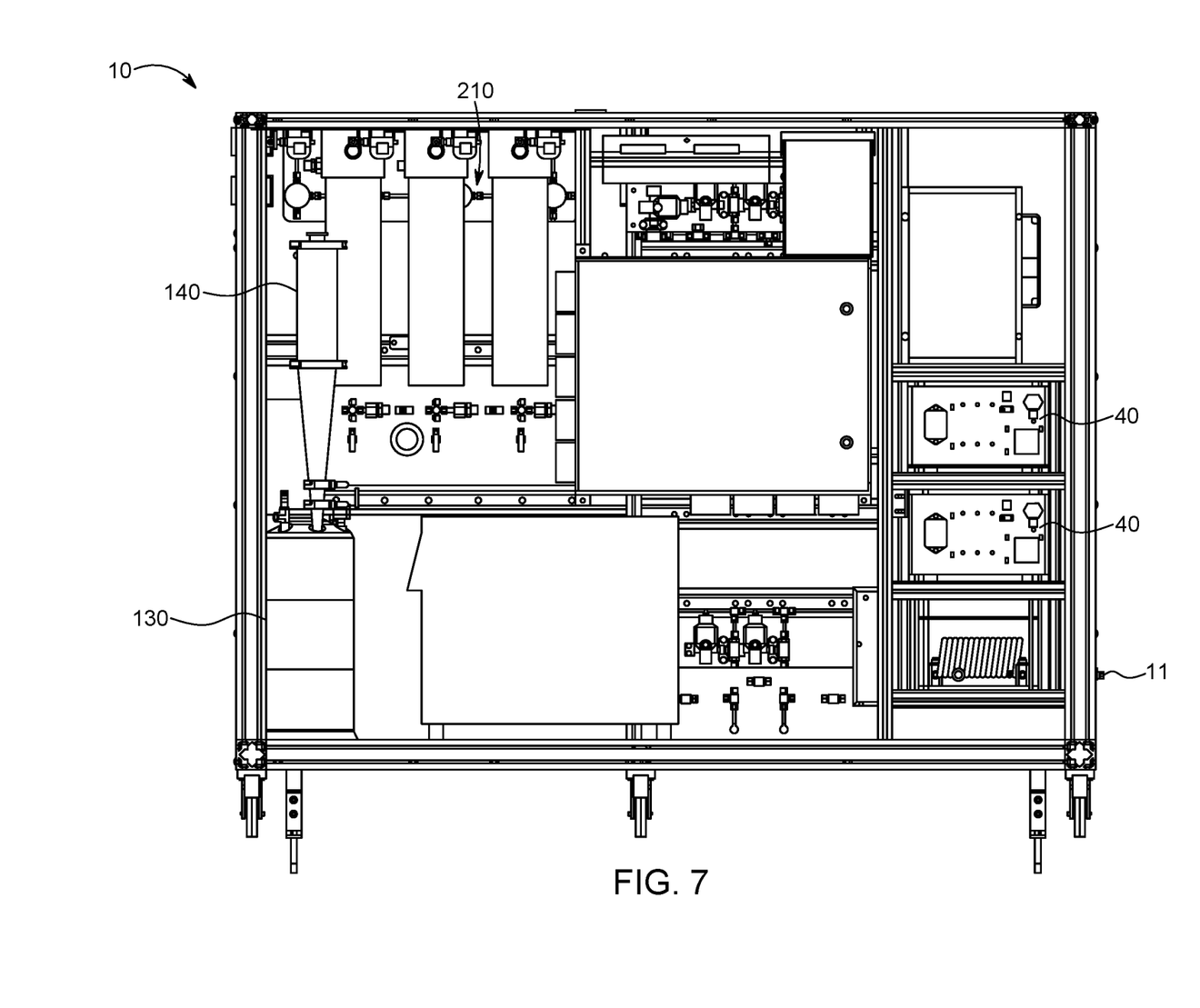
FIG. 7 is a rear elevational view of an embodiment of an extraction system of the present invention.

An example extraction system 10 of the present invention is illustrated in FIGS. 5-7. A solvent fluid inlet including a fitting for connection to solvent fluid source 22 fluidly connects the solvent fluid source 22 to a solvent fluid filter 23. Solvent fluid passing through solvent fluid filter 23 may be cooled by heat exchanger 28 and motivated by one or more fluid pumps 40. Extractor vessels 12 are fluidically connected to separation vessels 60, 70, 80, through back pressure regulator valves 50, 52, and 54. Precipitate valve ports 68, 78, 88 enable collection of extractants by collection vessel 180 through flexible hose 186 and coupler 188. A suction hood 160 withdraws gaseous solvent fluid from collection vessel 80 to either waste disposal or recycling system 210. Back pressure regulator 56 maintains pressure at third separation vessel 80, wherein process fluid passing through back pressure regulator valve 56 may be conveyed to one or both of recycling system 210 and waste vessel 130 for recovery of solvent fluid separate and apart from the extracted constituents. Separation column 140 is illustrated as being fluidically connected to waste chamber 132 of waste vessel 130 for removal of constituents, such as terpenes, from the process fluid. Separation column 140 may include, as described above, a fluidized bed for collection of constituents, such as terpenes.

In some embodiments of the present invention, the sample material may be processed prior to placement in the one or more extraction vessels 12 in order to most efficiently extract targeted extractables from the sample material. It has been found by the Applicant that solid sample material may preferably be ground to a predetermined particle size distribution for best extraction results. In an example plant-based sample material, grinding the raw sample with a cone mill grinder available from Quadro Engineering to a substantially monodisperse particle size distribution of between about 100 and 200 micrometers results in superior extractions.

A solvent fluid meter may be incorporated into the system so that the solvent fluid pressure may be monitored inside the system. If solvent fluid pressure exceeds 9000 ppm, the pump is directed to shut down and the valves close automatically. Various sensors may be implemented to coordinate with the monitoring system.

The ground sample material or solid phase extraction media may be conveniently stored and/or extracted within fluid-permeable containers 92 such as bags, boxes, tubes, envelopes, and the like, wherein the containers holding the sample material may be placed in the extraction vessels 12 for extraction processing of the sample material. Caps 14 may have disposed within them porous filter elements to support the permeable bags during fluid filling and emptying of extraction vessels 12. Flow distribution elements may be incorporated into the heads to distribute the flow across the filter element. All relevant surfaces may be smooth so that the bag does not tear. To permit suitable exchange of solvent fluid 20 into contact with the sample material, and for process fluid to flow out from the sample filter container 92, it is preferred that the sample filter container 92 have a fluid permeability to the sample fluid 20 and the process fluid. In some embodiments, sample filter container 92 may be porous, with a maximum pore size that is preferably smaller than the average particle size of the ground sample material, and more preferably smaller than at least 70% of the ground sample material particles, and still more preferably smaller than at least 90% of the ground sample material particles. An example material for sample filter container 92 is nylon mesh available from universal filters, having a pore size of 5-10 μm. It has been found by the Applicant that use of sample filter container 92 in extraction vessels 12 substantially enhance extraction performance, and also facilitate ease of removal of the spent sample material from extraction chamber 16 following the batch extraction process. In some cases, the ground sample material is completely contained within sample filter container 92, such that between-batch cleaning of extraction chamber 16 is unnecessary.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A method for preparing a botanical oil, said method comprising:
 (a) diffusing a supercritical fluid solvent into a botanical sample matrix to form a process fluid including said supercritical fluid solvent and an extractant;
 (b) depressurizing said process fluid to a first separation pressure in a first separation chamber, wherein at least a portion of said extractant precipitates from the process fluid;
 (c) depressurizing said process fluid to a second separation pressure in a second separation chamber, wherein at least a portion of the extractant precipitates from the process fluid, said second separation chamber being fluidically connected to said first separation chamber through a first separation back pressure regulator that maintains the first separation pressure greater than the second separation pressure;
 (d) collecting the precipitated extractant from said first separation chamber through a lumen defined between an inlet and an outlet of a flexible collection hose removably fluidically connecting said first separation chamber to a collection chamber in a collection vessel, wherein the collection chamber is maintained at a collection pressure that is less than the first separation pressure;

(e) collecting the precipitated extractant from said second separation chamber through the lumen of said flexible collection hose removably fluidically connecting said second separation chamber to said collection chamber in said collection vessel, wherein the collection pressure is less than the second separation pressure, and wherein the precipitated extractant is selectively collected from said first and second separation chambers through the flexible collection hose by selectively disconnecting the inlet of the flexible collection hose from the first separation chamber, and connecting the inlet of the flexible collection hose with the second separation chamber; and (f) delivering thermal energy to said flexible collection hose to an extent sufficient to counteract expansion cooling of the process fluid passing through said flexible collection hose to said collection chamber.

2. A method as in claim 1, including delivering thermal energy to said collection vessel to an extent sufficient to suitably heat the collection chamber to avoid solidification of the fluid solvent in the collection chamber.

3. A method as in claim 1 wherein the collection pressure exceeds 70 psi.

4. A method for preparing a botanical oil as in claim 1 wherein said collection vessel includes a first collection back pressure regulator to maintain the collection pressure in said collection chamber.

5. A method for preparing a botanical oil as in claim 4 wherein said collection vessel includes a valved vent for selectively releasing process fluid from said collection chamber.

6. A method for preparing a botanical oil as in claim 5, including conveying the process fluid released from said valved vent through a disposal conduit in a disposal flow under a negative pressure.

7. A method for preparing a botanical oil as in claim 6, including accelerating the disposal flow through an orifice.

8. A method for preparing a botanical oil as in claim 7, including selectively adjusting a configuration of the orifice with a slide valve.

9. A method for preparing a botanical oil as in claim 6 wherein at least a portion of said disposal conduit is electrically grounded.

10. A method for preparing a botanical oil as in claim 9 wherein said at least portion of said disposal conduit is metal.

11. A method for preparing a botanical oil as in claim 1, including further depressurizing the process fluid to a third separation pressure in a third separation chamber, wherein at least a portion of the extractant precipitates from the process fluid, said third separation chamber being fluidically connected to said separation chamber through a second separation back pressure regulator that maintains the second separation pressure greater than the third separation pressure.

12. A method for preparing a botanical oil as in claim 11, including collecting the precipitated extractant from said third separation chamber through the lumen of said flexible collection hose removably fluidically connecting said third separation chamber to said collection chamber in said collection vessel, wherein the collection pressure is less than the third separation pressure.

13. A method for preparing a botanical oil as in claim 12, including maintaining said collection vessel in a stationary position while sequentially connecting the precipitated extractant from said first, second, and third separation chambers.

14. A method for preparing a botanical oil, said method comprising:

(a) diffusing a supercritical fluid solvent into a botanical sample matrix to form a process fluid including an extractant dissolved in said supercritical fluid solvent;

(b) depressurizing said process fluid to a first separation pressure in a first separation chamber, wherein at least a portion of said extractant precipitates from the process fluid;

(c) conveying the process fluid from said first separation chamber through a valve to further depressurize said process fluid to a transfer pressure in a transfer line;

(d) delivering thermal energy to said transfer line to an extent sufficient to counteract expansion cooling of the process fluid passing through said transfer line to a waste chamber in a waste vessel, wherein the waste chamber is maintained at a waste pressure that is less than the first separation pressure;

(e) conveying the process fluid from said waste chamber through a scrubbing column packed with an adsorbent material capable of adsorbing terpene; and (f) collecting process fluid exiting from said scrubbing column in a vent conduit under negative pressure through a suction hood positioned adjacent to a process fluid outlet of said scrubbing column.

15. A method for preparing a botanical oil as in claim 14 wherein said waste pressure is less than said transfer pressure.

16. A method for preparing a botanical oil as in claim 15 wherein said waste pressure exceeds 70 psi.

17. A method for preparing a botanical oil as in claim 14 wherein the thermal energy delivered to said transfer line is sufficient to avoid solidification of the process fluid in said transfer line.

18. A method for preparing a botanical oil as in claim 14, wherein said adsorbent material includes carbon.

19. A method for preparing a botanical oil as in claim 18 wherein said adsorbent material forms a fluidized bed through which the process fluid is conveyed.

20. A method for preparing a botanical oil as in claim 19, including an orifice in said vent conduit that is configured to accelerate the process fluid when acted upon by the negative pressure.

21. A method for preparing a botanical oil as in claim 20, including a slide valve that is selectively operable to adjust a configuration of said orifice.

* * * * *

UNITED STATES PATENT AND TRADEMARK OFFICE
CERTIFICATE OF CORRECTION

PATENT NO. : 11,015,142 B1
APPLICATION NO. : 15/787994
DATED : May 25, 2021
INVENTOR(S) : Jon Thompson, Conor Smith and Yuri Gerner Page 1 of 1

It is certified that error appears in the above-identified patent and that said Letters Patent is hereby corrected as shown below:

In the Specification

Column 10, Line 66, ""outs" to recycling system 210. An example recycling" should read -- "$out_1$" to recycling system 210. An example recycling --.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*